United States Patent

[11] 3,537,478

[72] Inventors Bryce B. Evans;
 Charles F. Crissy, Jackson, Michigan
[21] Appl. No. 771,415
[22] Filed Oct. 29, 1968
[45] Patented Nov. 3, 1970
[73] Assignee Aeroquip Corporation
 Jackson, Michigan

[54] QUICK ACTING FLUID COUPLING
 6 Claims, 8 Drawing Figs.
[52] U.S. Cl. ..................................................137/614.04,
 285/1, 285/316
[51] Int. Cl. .................................................... F16l 19/00,
 F16l 37/22
[50] Field of Search............................................137/614.05,
 614.04; 285/1, 316

[56] References Cited
 UNITED STATES PATENTS
2,699,961 1/1955 Omon et al. ................... 285/1X
3,279,827 10/1966 Brown......................... 285/1

Primary Examiner—Martin P. Schwadron
Attorney—Jerry K. Harness

ABSTRACT: A fluid coupling having interfitting male and female bodies with opposing valves opened when the bodies are connected. A manually retractable spring-pressed sleeve on the female body cams detents inwardly to lock the male body in position. The female body and sleeve are slidably mounted on a fixed support by two separate one-way connections acting in opposite directions. This enables the coupling to be quickly disconnected merely by pulling on the male body. To connect the coupling, the sleeve is manually retracted to permit outward movement of the detents when the male body is inserted. It is unnecessary to grasp the female body when retracting the sleeve. Therefore, both the connect and disconnect operations may be accomplished by an operator who has access only to the exposed portion of the female coupling.

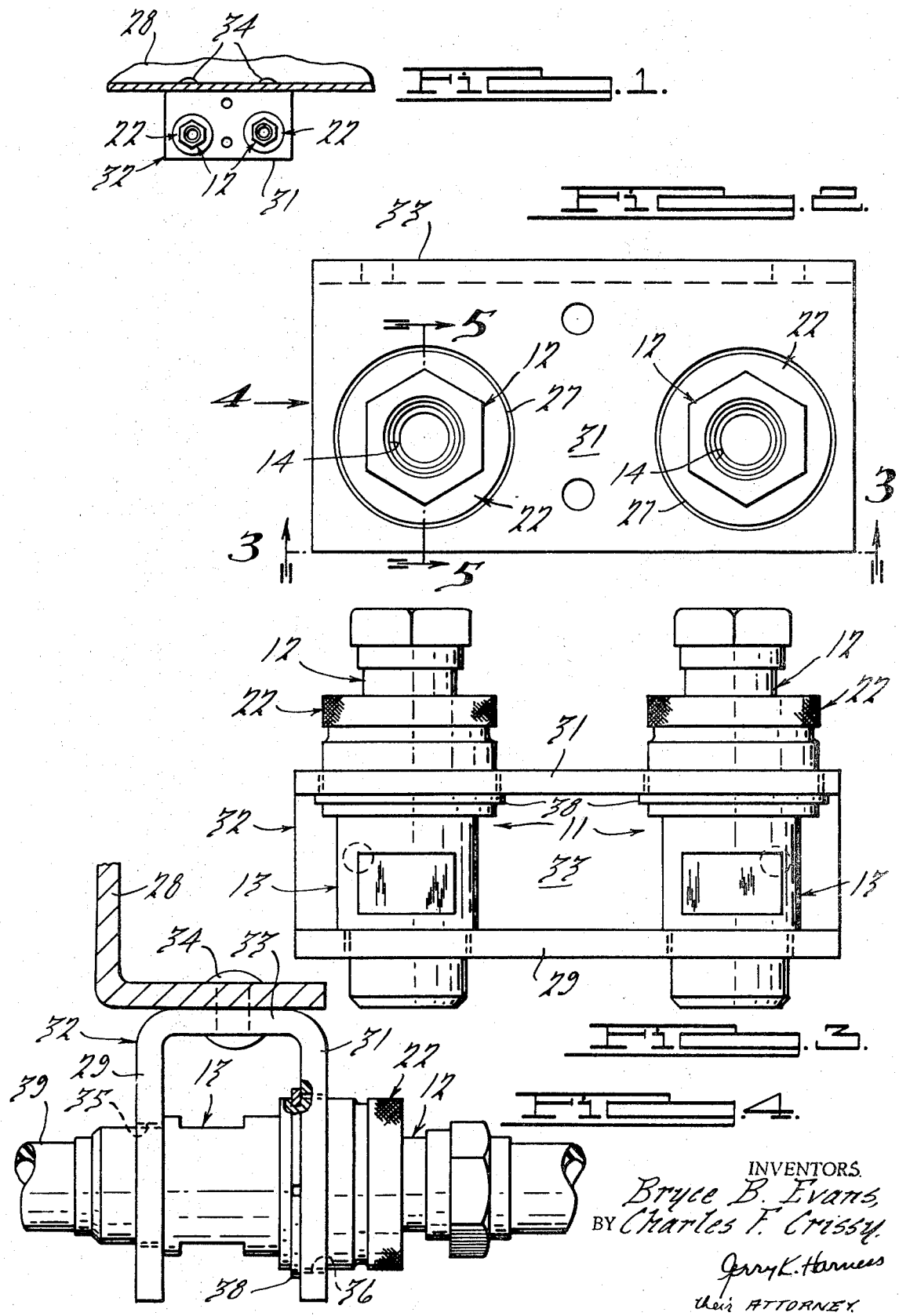

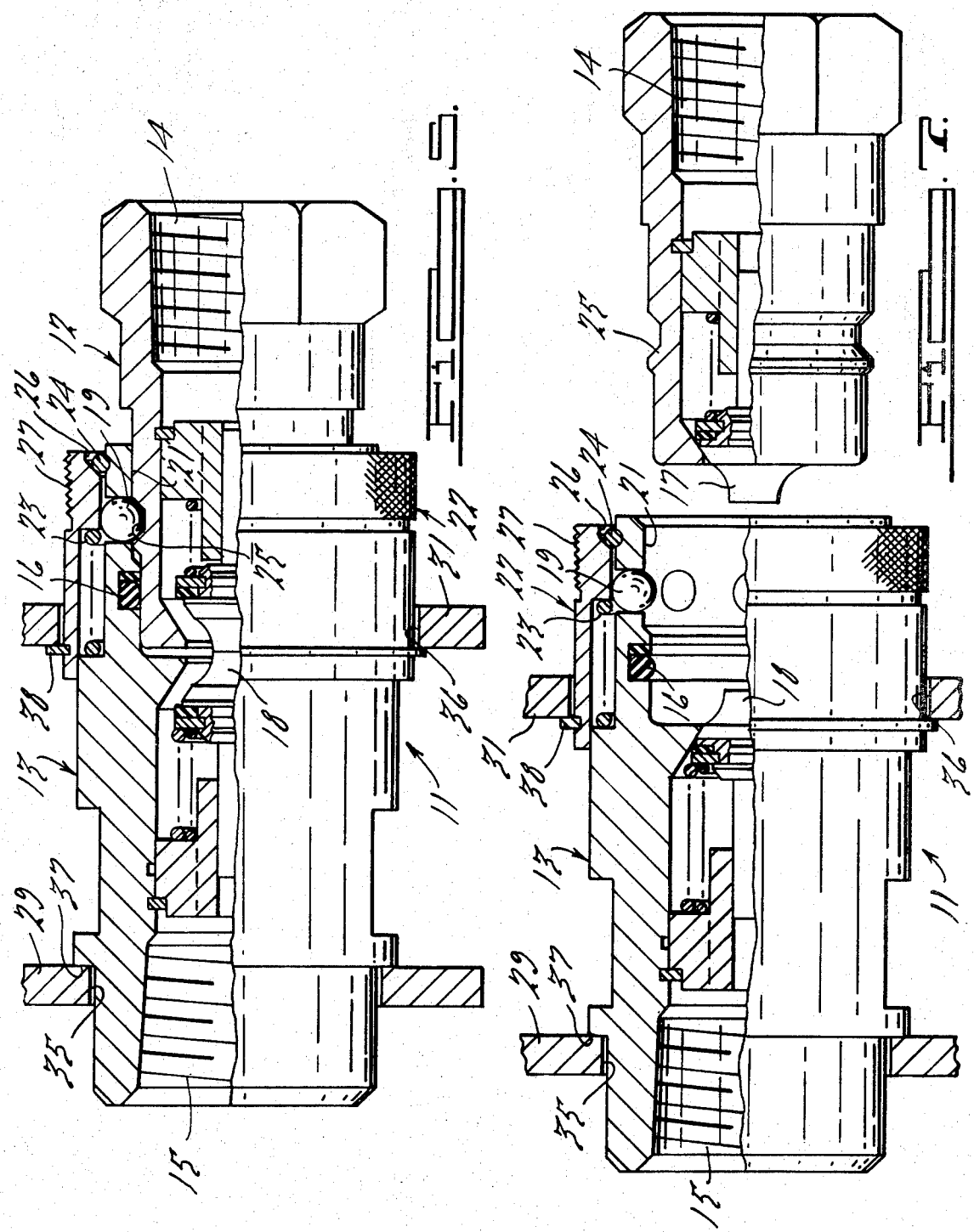

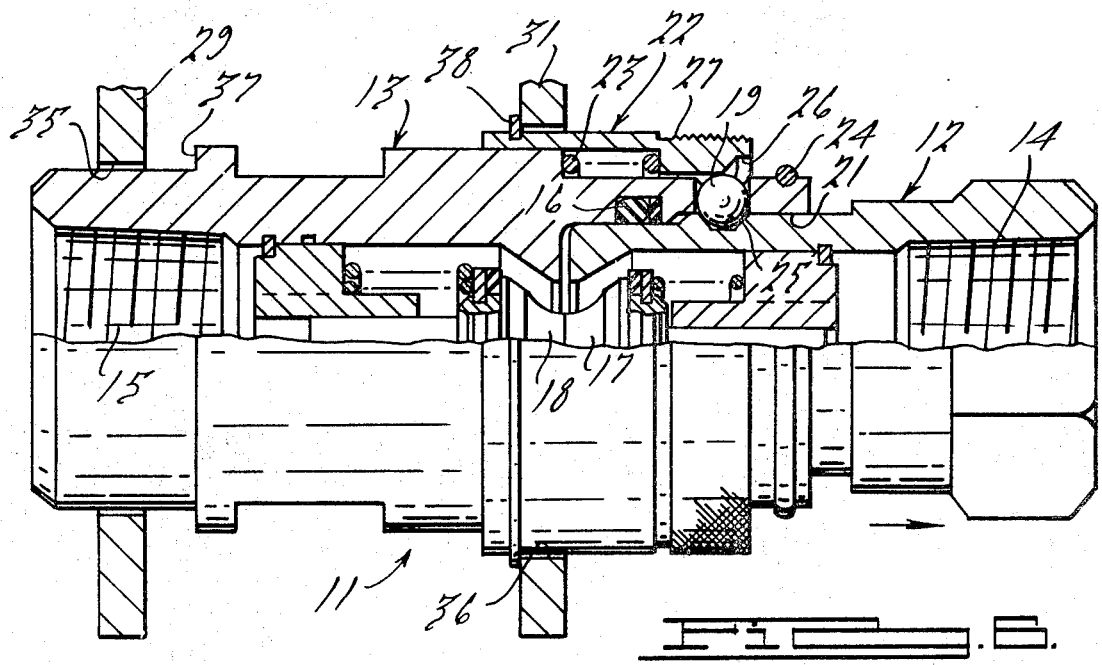
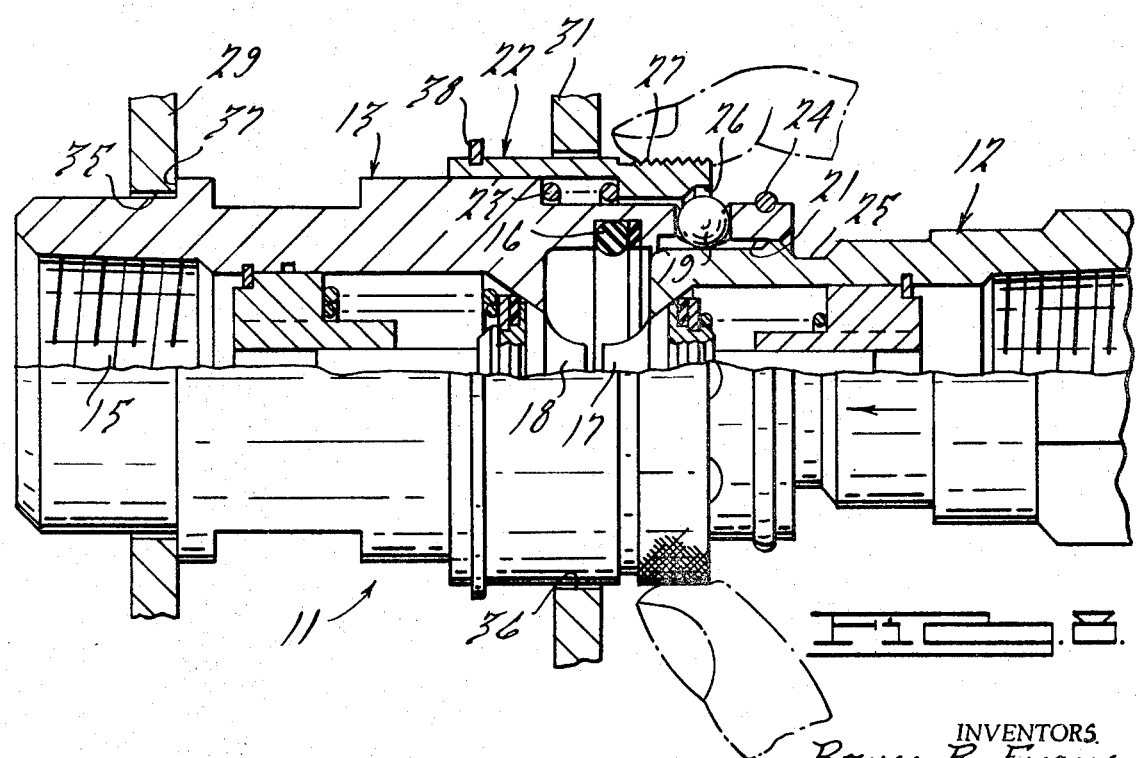

QUICK ACTING FLUID COUPLING

BACKGROUND OF THE INVENTION

1. Field of the Invention

The invention relates to fluid couplings of the type having interfitting male and female bodies, the female body having a manually retractable spring-pressed sleeve which, when released, cams detents inwardly to lock the male body in place. If the sleeve is secured to a fixed support, the coupling is quickly disconnectable by pulling on the male body. This will cause the female body to travel with respect to the sleeve until the detents are free to move outwardly.

2. Description of the Prior Art

In the prior art construction, the sleeve was fixedly secured to the stationary support, for example, the rear of a tractor, the female body extending forwardly from the sleeve and being connected to a hose. The male body, secured to an implement being towed by the tractor, could thus be quickly disconnected from the female body, by pulling it rearwardly, or by the tractor pulling the sleeve forwardly with respect to both the male and female bodies. However, in order to connect the coupling, it was necessary to reach behind the fixed sleeve and grasp the female body, forcing it and holding it rearwardly until the detents were freed to move outwardly when the male body was inserted. Thus, the operator had to simultaneously grasp the female body forwardly of the fixed sleeve support and the male body rearwardly of this support, forcing these two parts toward each other. Aside from the inconvenience of this construction, it limited the manner in which the female body and sleeves could be mounted.

SUMMARY OF THE INVENTION

According to the invention, neither the sleeve nor the female body are rigidly secured to the stationary support. Instead, two oppositely acting slidable one-way supports are used to mount the female body and sleeve. The support for the female body permits this body to be pulled rearwardly with respect to the sleeve but limits its forward movement. The support for the sleeve, on the other hand, permits it to be retracted forwardly but limits its rearward movement. The result is that the male body may by disconnected from the female body as before, by pulling it rearwardly from the female body or pulling the sleeve forwardly with respect to both bodies. However, to reconnect the coupling, it is merely necessary to grasp the sleeve and push it forwardly, without having to reach around to grasp the female body, since the latter is held against forward movement. Freeing of the detents will permit the male body to be inserted.

BRIEF DESCRIPTION OF THE DRAWINGS

FIG. 1 is a front elevational view of a pair of couplings and a bracket which supports the female bodies and sleeves in the manner described above and is secured to the stationary support, the latter being sectioned for clarity;

FIG. 2 is an enlarged rear elevational view of the bracket and the couplings;

FIG. 3 is bottom plan view of the bracket and couplings taken along the line 3–3 of FIG. 2;

FIG. 4 is an end elevational view of the bracket with one coupling visible, taken in the direction of the arrow 4 in FIG. 2;

FIG. 5 is a sectional view in elevation showing the coupling in connected position, taken along the line 5–5 of FIG. 2;

FIG. 6 is a view similar to FIG. 5 but showing the sleeve being pulled forwardly with respect to the bodies to disconnect the coupling;

FIG. 7 is a view similar to FIGS. 5 and 6, showing the male and female bodies disconnected, and;

FIG. 8 is a view similar to FIGS. 5, 6, and 7 showing the sleeve being retracted so that the male body may be reinserted.

DESCRIPTION OF THE PREFERRED EMBODIMENT

The type of coupling with which the invention is concerned is seen best in FIGS. 5 through 8. The coupling is generally indicated at 11 and comprises a male body generally indicated at 12 and a female body generally indicated at 13. These bodies are of elongated and of generally tubular shape, having threaded ports 14 and 15 respectively at their outer ends for connection to fluid lines. Body 12 is insertable in body 13, engaging an annular seal 16 carried by the female body to form a fluid-tight coupling.

Spring-pressed valves 17 and 18 are mounted within bodies 12 and 13 respectively, these valves being closed when the bodies are disconnected but forcing each other open when the bodies are connected. The two bodies of the coupling may thus be connected with fluid pressure existing in either or both bodies, since valves 17 and 18 will not be opened until body 12 is inserted within seal 16.

The means for locking bodies 12 and 13 together comprises a series of spherical detents 19 carried by radial apertures in body 13 and surrounding the portion 21 of the female body bore which receives male body 12. The apertures for detents 19 are slightly narrowed at their inner ends to prevent the detents from falling out. The position of detents 19 is controlled by a sleeve indicated generally at 22 slidably mounted with respect to body 13. Sleeve 22 surrounds detents 19 and is urged by a helical coil compression spring 23 toward an outer position against a snap ring 24 carried by the adjacent end of body 13. Spring 23 is disposed in a space formed between the sleeve and female body, between facing shoulders thereon. The diameter of detents 19 relative to that of male body 12 within bore portion 21 is such that when sleeve 22 is so extended, the detents will be held within a locking groove 25 formed on the exterior of body 12. This locking groove will be in registry with detents 19 only when male body 12 is in its fully inserted position within the female body 13. This locking position is seen in FIG. 5. Pulling of male body 12 to the right or sleeve 22 to the left will cause an axial force to be exerted on female body 13, this force being transmitted through detents 19, but the coupling bodies will be held in connected position until detents 19 can be forced outwardly to release the male body.

Release of the detents is accomplished by sliding female body 13 and sleeve 22 relative to each other until a widened portion 26 of the sleeve is in registry with detents 19. During this movement, spring 23 is compressed.

Sleeve 22 is provided with a knurled outer surface 27 which may be grasped by the fingers of the operator. Since it is relative movement between sleeve 22 and body 13 which brings bore portion 26 into registry with detents 19, sliding sleeve 22 to the left (FIG. 8) or sliding female body 13 to the right (Fig. 6) will accomplish this purpose. By virtue of the novel construction of this invention, described in detail below, connection of the coupling bodies is accomplished by the method of FIG. 8 (sliding the sleeve to the left), whereas disconnection of the bodies is achieved by sliding female body 13 to the right (FIG. 6).

The invention contemplates a novel construction for supporting and interconnecting female body 13 and sleeve 22 so that the connection and disconnection may be accomplished by an operator having access only to the coupling end of the female body, that is, the end remote from port 15. More particularly, means are provided for connecting both female body 13 and sleeve 22 to a fixed support (FIGS. 1 and 3), which may be a cross frame member at the rearward end of a tractor, the direction of towing being leftwardly in FIG. 4. Means are provided below member 28 for slidably supporting both female body 13 and sleeve 22 in such manner that body 13 may move rightwardly in FIG. 4 but has limited leftward movement, whereas sleeve 22 may be retracted leftwardly but is limited in its rightward movement.

Body 13 is supported by a member 29 and sleeve 22 by a member 31, these two members comprising downwardly extending arms of an inverted U-shaped bracket generally indicated at 32. This bracket has an upper central web 33 secured to the underside of frame member 28 by fasteners 34. Both arms 29 and 31 have apertured portions 35 and 36 respectively, which slidably receive body 13 and sleeve 22.

As seen in FIGS. 5 through 8, body 13 is provided with a shoulder 37 and sleeve 22 is provided with a shoulder formed by a snap ring 38 carried thereby. These two shoulders engage the facing surfaces of arms 29 and 31 respectively, so as to limit the leftward movement of body 13 and the rightward movement of sleeve 22.

In the illustrated embodiment, bracket 32 is shown as carrying two female bodies 13 and sleeves 22 of a pair of identically constructed couplings 11.

In operation, assuming an initial position of the parts as shown in FIG. 5, the coupling bodies will be connected by virtue of the open positions of valves 17 and 18 and the seal 16 which surrounds male body 12 inserted in female body 13. The parts will be locked in their connected position by detents 19 held inwardly by sleeve 22.

If it is desired to disconnect the coupling, a rightward force will be exerted on male body 12, as shown by the arrow in FIG. 6, or a leftward force will be exerted on sleeve 22 by member 31. The latter will occur, for example, if the trailer or implement (not shown) to which male body 12 is connected becomes unhitched from the tractor, which continues to move forwardly. In either case, since detents 19 cannot be cammed outwardly because they are surrounded by sleeve 22, this force will cause both bodies to move rightwardly with respect to sleeve 22, compressing spring 23 and withdrawing shoulder 37 from member 29. Fluid line 39, connected to body 13, is flexible so as to permit this movement.

The rightward movement of the two coupling bodies will continue until detents 19 reach large bore portion 26, at which time the detents will be cammed outwardly, releasing male body 12. As male body 12 leaves female body 13, valves 17 and 18 will close, retaining fluid within the coupling bodies. Spring 23 will return body 13 to the left until shoulder 37 engages member 29. The coupling parts will then be in the position shown on FIG. 7.

To connect the coupling, the operator will grasp knurled portion 27 of sleeve 22 with his fingers, as shown in FIG. 8, and will slide this sleeve leftwardly, body 13 being held against movement by member 29 as spring 23 is compressed. As enlarged bore portion 26 reaches detents 19, they will be released so that male body 12 may be inserted in female body 13, the detents being cammed outwardly by male body 12 until groove 25 is in registry with the detents. Sleeve 22 may then be released, and spring 23 will slide it rightwardly, locking detents 19 in groove 25. The coupling will then be in the FIG. 5 position.

It should be noted that this connecting operation will not require that the operator hold the female body 13, since shoulder 37 on the female body will engage member 29 to prevent leftward movement thereof. Both connection and disconnection of the coupling may thus be accomplished quickly and easily by a person having access only to the mating end of the female coupling body.

We claim:

1. In a coupling of the type having a female body, a male body insertable in said female body, radially movable detents carried by said female body, and a sleeve slidable with respect to said female body, spring-pressed toward a position holding said detents in locking engagement with said male body, and manually retractable to release said detents, means mounting said female body and sleeve on a fixed support comprising a pair of spaced members secured to said fixed support and slidably supporting said female body and sleeve respectively, shoulders on said female body and sleeve engaging the facing surfaces of said members, whereby pulling said male body away from said female body when the male body is locked in its inserted position will cause said female body and detents to slide relative to said female body support and said sleeve until the detents are released, and a surface on said sleeve exposed for manual grasping on the side of said sleeve support opposite that facing the sleeve shoulder, whereby the coupling may be reconnected by grasping and sliding the sleeve relative to said female body to release said detents, the female body being held against movement by engagement of its shoulder with its support.

2. The combination according to claim 1, wherein said two spaced members comprise arms of a U-shaped bracket secured to said fixed support.

3. The combination according to claims 1 or 2, the means for spring-pressing said sleeve comprising a helical coil compression spring within a space formed between said sleeve and female body, and facing shoulders on the sleeve and female body engageable with the ends of said spring, the spring thus acting to return the female body and sleeve to their positions engaging said supporting members after the coupling bodies are connected or disconnected.

4. The combination according to claims 1 or 2, further provided with a pair of oppositely acting spring-pressed valves within said male and female bodies, the valves being opened on mutual engagement when the male body is connected to the female body, and a seal carried by one of said bodies and engageable with the other body upon connection therewith before said valves are opened.

5. The combination according to claims 1 or 2, the shoulder on said sleeve being formed by a snap ring retained in a groove formed in the sleeve.

6. The combination according to claim 2, said U-shaped bracket being inverted and secured to the underside of a tractor rear frame member.